(12) United States Patent
Tandog et al.

(10) Patent No.: US 11,260,691 B2
(45) Date of Patent: Mar. 1, 2022

(54) INTERCHANGEABLE HUB SYSTEM FOR BICYCLE

(71) Applicant: Two Point Zero USA, Inc., Los Angeles, CA (US)

(72) Inventors: Ray Tandog, Glendale, CA (US); Lynn Perrando, Hillsborough, CA (US)

(73) Assignee: Two Point Zero USA, Inc., Los Angeles, CA (US)

(*) Notice: Subject to any disclaimer, the term of this patent is extended or adjusted under 35 U.S.C. 154(b) by 279 days.

(21) Appl. No.: 16/272,994

(22) Filed: Feb. 11, 2019

(65) Prior Publication Data
US 2020/0254814 A1    Aug. 13, 2020

(51) Int. Cl.
*B60B 27/02* (2006.01)
*B60B 27/00* (2006.01)

(52) U.S. Cl.
CPC .......... *B60B 27/026* (2013.01); *B60B 27/023* (2013.01); *B60B 27/0026* (2013.01)

(58) Field of Classification Search
CPC ..... B60B 27/023; B60B 27/026; B60B 27/04; B60B 27/047; B60B 27/0047; B60B 27/065
See application file for complete search history.

(56) References Cited

U.S. PATENT DOCUMENTS

| | | | | |
|---|---|---|---|---|
| 5,518,096 A * | 5/1996 | Lin | ................... | B60B 27/023 192/64 |
| 6,264,285 B1 * | 7/2001 | Yu | ..................... | F16D 41/28 192/64 |
| 7,494,145 B2 | 2/2009 | Schroeder et al. | | |
| 9,016,802 B2 * | 4/2015 | Kitamura | ............... | B60B 27/023 301/110.5 |
| 2005/0275561 A1 * | 12/2005 | Kolda | .................. | H04Q 9/00 340/870.07 |
| 2006/0191764 A1 | 8/2006 | Kanehisa et al. | | |
| 2007/0024106 A1 * | 2/2007 | Urabe | ................ | B60B 27/0047 301/110.5 |
| 2008/0116658 A1 * | 5/2008 | Schroeder | ............. | B60B 35/004 280/276 |
| 2012/0104838 A1 * | 5/2012 | Chen | ..................... | B60B 27/023 301/110.5 |
| 2016/0368318 A1 | 12/2016 | Van Druten et al. | | |
| 2017/0174287 A1 | 6/2017 | Huang et al. | | |

FOREIGN PATENT DOCUMENTS

WO    2018/011709 A1    1/2018

OTHER PUBLICATIONS

International Search Report and Written Opinion for related PCT Application No. PCT/US2019/017887, dated Apr. 23, 2019, in 12 pages.

* cited by examiner

*Primary Examiner* — Kip T Kotter
(74) *Attorney, Agent, or Firm* — Procopio, Cory, Hargreaves & Savitch LLP

(57) ABSTRACT

An interchangeable hub system for a bicycle having an internal component holding a wheel cassette and a hub shell having wheel (spokes, tires) built thereon. The hub system allows for the internal component with the cassette to be interchanged between hub shells allowing for cassettes to be interchanged between wheels sets without a number of specialized tools.

4 Claims, 18 Drawing Sheets

INTERCHANGEABLE HUB SYSTEM FOR BICYCLE

BACKGROUND OF THE INVENTION

The present invention relates to hub system for a bicycle, more particularly to an interchangeable hub system for a bicycle. Specifically, the present invention is directed to a multi-piece bicycle rear wheel hub system that allows a bicycle cassette to remain on an internal component of the hub system and then removed from the hub shell, allowing for cassettes to be interchanged easily between wheel sets without the use of specialized bike tools.

In order to move a cassette from one wheel to another, traditional bicycle hub systems require removal of the cassette from the bicycle wheel hub, which requires a bicycle mechanic and/or special tools such as a long ring tool, chain whip and crescent wrench. Not only does cassette removal require these special tools, the process can be tedious and time consuming to a non-mechanic bike rider. In other words, cyclists who want different cassettes and/or wheels need to have complete sets of wheels and cassettes.

The present invention addresses, among other things, the compatibility issue but also the requirement of special tools that most users do not have in their homes. The hub system in accordance with the present invention would allow for the use of one interchangeable cassette for a variety of wheel systems. The hub system in accordance with the present invention would be space-saving. Since the cassettes can be interchangeable among different wheel sets, use of the hub system in accordance with the present invention eliminates the requirement of each wheel sets having its own cassette.

As described above, the hub system in accordance with the present invention addresses the inconvenience of changing cassettes between different bicycle wheels, the rear wheel in particular. For example, if a user owned three different wheel models, he or she would be required to purchase three cassettes for each rear wheel. The hub system in accordance with the present invention eliminates the need to have one cassette per rear wheel by having the rear wheel to be built with spokes onto the hub shell, while the internal component with the cassette can be removed and installed in a different rear wheels using a compact and simple lock ring tool. When not in use, the internal component can be stored separately so the wheels can be stored or transported easily. The hub system in accordance with the present invention would allow the user to save money by eliminating the cost of an additional cassette purchase and additional shipping containers to transport multiple wheel sets to races or events.

The interchangeable hub system in accordance with the present invention allows a user interchangeability between wheel sets. In another example, if a user has a wheel set that is 38 mm in depth and would like to take advantage of the aerodynamic offerings of a 50 mm or 85 mm wheel set, the user would simply remove two lock rings, remove the entire internal component and move it the desired wheel set. In many cases, users own more than one model wheel set from the same company. Depending on how many wheel sets are owned, one could determine how many hub cassettes the person would have to purchase for each wheel set. With the hub system in accordance with the present invention, the user would only be required to purchase one wheel set with the internal component and future wheel sets would only need to be assembled with the empty hub shell laced to the rims, thus saving the customer time and money. With the current process, a user would need a cassette lock ring tool, a chain whip and a wrench to remove and reinstall the cassette. With the hub system in accordance with the present invention, only a single lightweight lock tool would be required for assembly and disassembly.

In addition to the above system uses, a user can move from a rim brake system with this hub to a disc brake system by merely adding end caps to the hub, allowing for additional space for the disc rotor to be added and/or subtracted. The user can add the end caps to the removable inner hub or remove the end caps from the inner hub, during the process of switching the wheel back and forth between bicycles. The current hubs are only made for one or the other. With the addition of the end caps, the users can choose for this one hub system to be interchangeable between both types of bicycle brake systems.

The hub system allows a user to remove the entire internal mechanism of a bicycle hub, leaving behind the outer shell that is laced to the spokes and rim of a wheel, and attach it to another wheel set's outer shell by the use of one tool. This eliminates the need for multiple tool to remove a cassette, eliminates the need for multiple hub internal mechanisms for each wheel and hub, and allows the user to utilize a single tool for changing a cassette when they choose to replace cassettes, as opposed to removing a cassette each time a rider wants to switch wheels. If the user is switching his wheel set between two bikes that have a rim brake system and a disc brake system, this same hub can be utilized between both systems. Other braking systems could be employed without departing from the general scope of the invention.

SUMMARY OF THE INVENTION

An interchangeable hub system having a hollow cylindrical hub shell having right and left distal ends, the hollow cylindrical hub shell having an opening therethrough and radially extending flanges at the right and left distal ends thereof, the radially extending flanges having regularly-spaced holes sized to receive bicycle wheel spokes; an internal component capable of sliding into the opening of the hollow cylindrical hub shell, the internal component having first and second distal ends with a skewer hole extending therethrough, wherein the first distal end comprises a slotted cassette holder body and the second distal end comprises a threaded portion; and a first lock ring capable of mating with the threaded portion of the internal component to secure the internal component within the cylindrical hub shell.

The interchangeable hub system can further have a plurality of edges forming a shape of a hexagon provided at each end of the opening of the cylindrical hub creating first and second hexagons, wherein the diameter of the first hexagon is greater than the diameter of the second hexagon to force an orientation. The system can also have an internal component having two discrete sections in the shape of hexagons to mate with the plurality of edges of said opening. The interchangeable hub system can also have a second lock ring capable of mating with the threaded portion of the internal component to secure the internal component within the cylindrical hub shell. The lock rings can also have a plurality of planar surfaces to allow for a lock ring tool to mate with and remove the lock rings. The opening of the cylindrical hub shell can also have a plurality of grooves formed in the opening of the cylindrical hub shell and two sets of cogs formed on the internal component, such that the grooves mate with the cogs.

BRIEF DESCRIPTION OF THE DRAWINGS

A more complete understanding of the present invention may be obtained with reference to the Detailed Description when taken in conjunction with the accompanying Drawings.

DETAILED DESCRIPTION OF THE INVENTION

Figure 1:
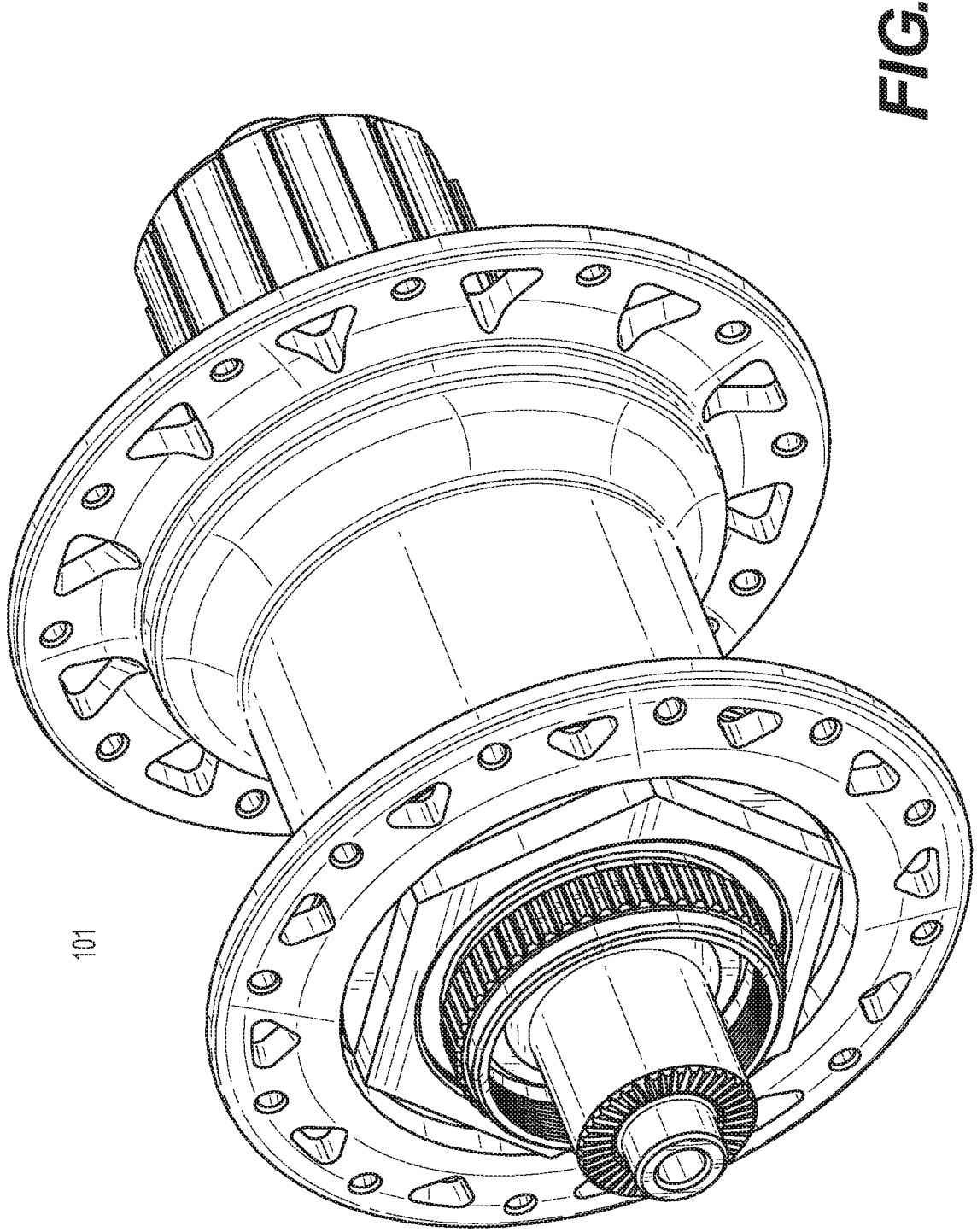
FIG. 1 shows a front perspective view of a first embodiment of an interchangeable hub system for bicycle wheel.
Figure 2:
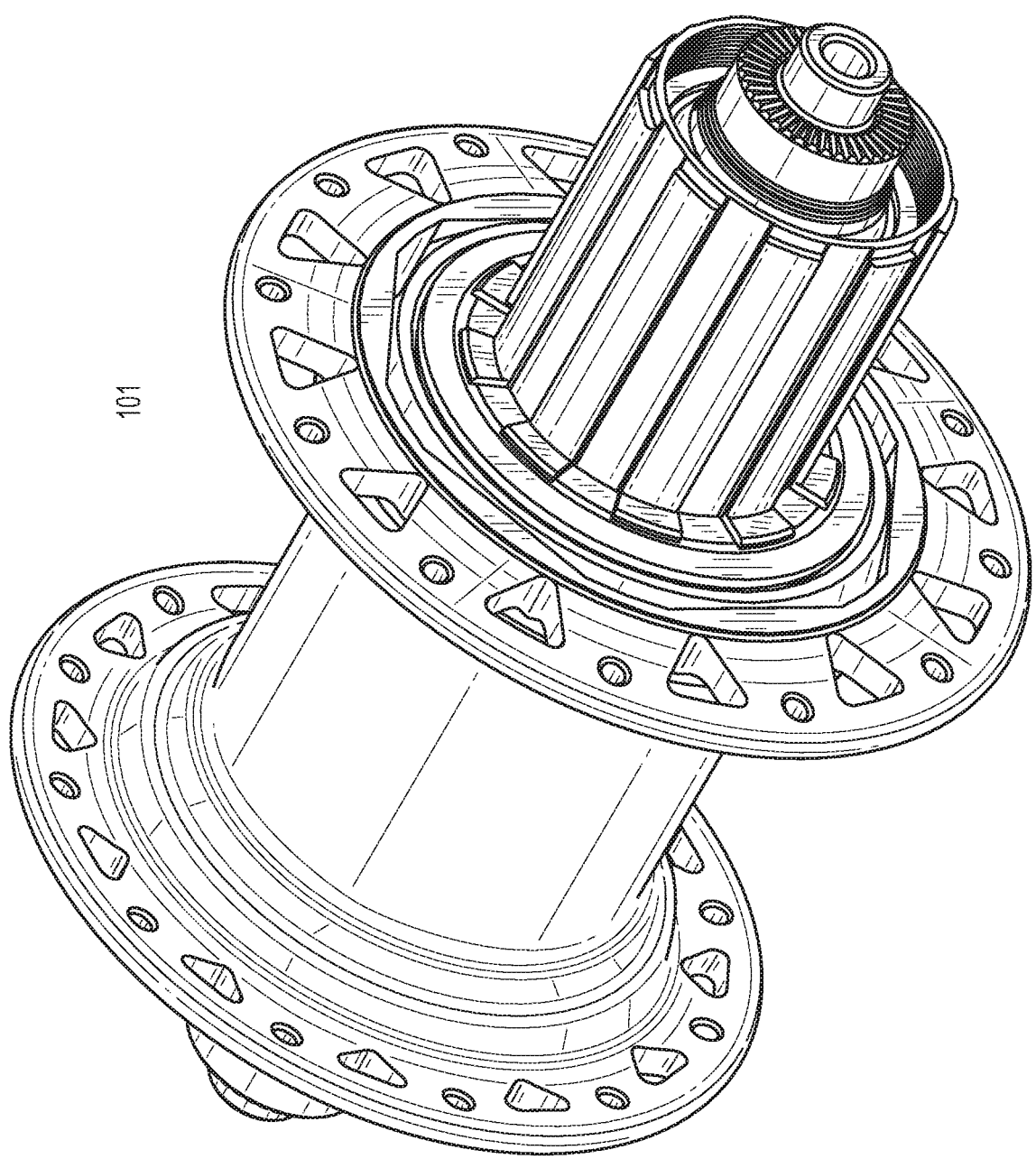
FIG. 2 shows a rear perspective view of the interchangeable hub system for bicycle wheel of FIG. 1.
Figure 3:
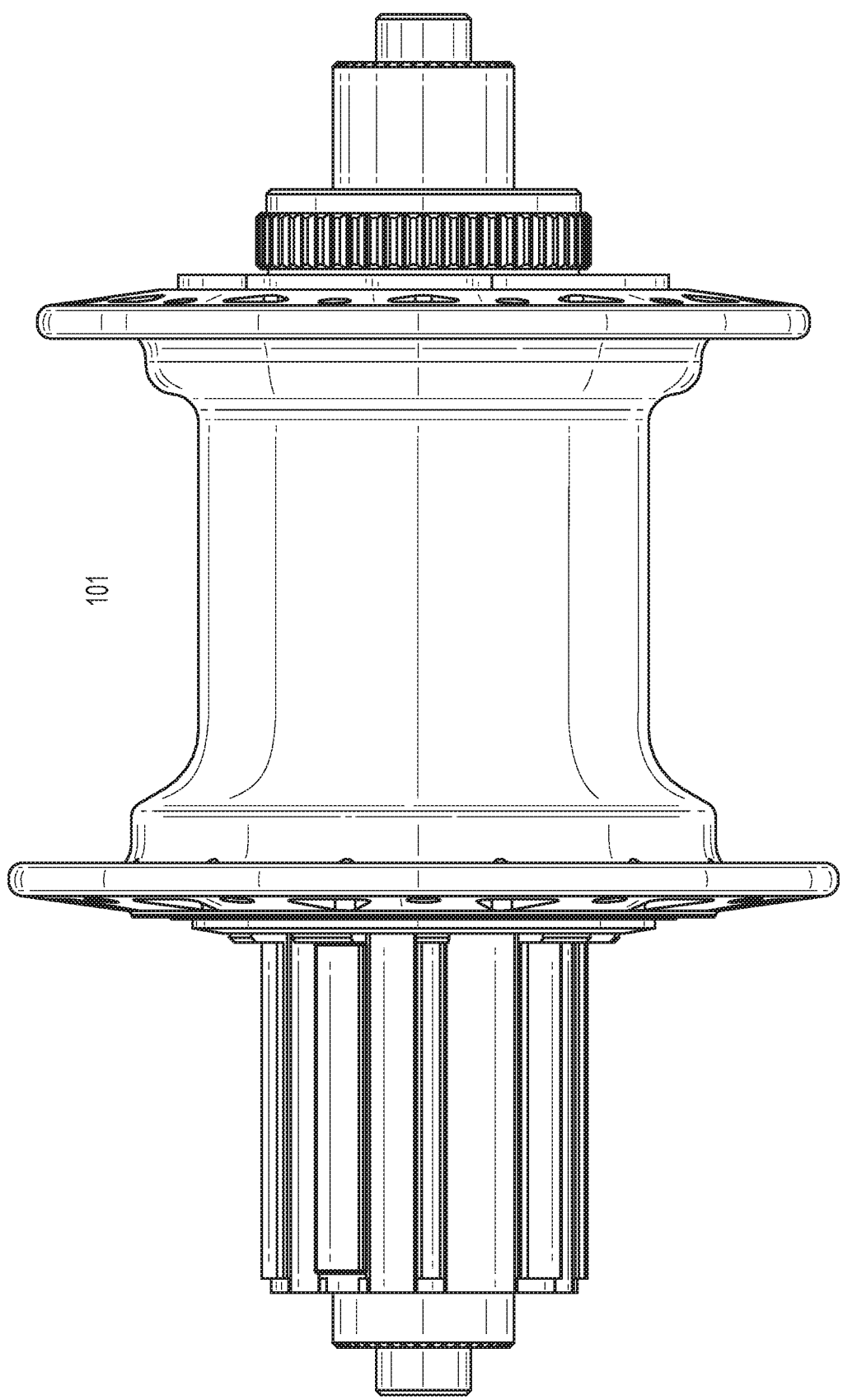
FIG. 3 shows a left plan view of the interchangeable hub system for bicycle wheel of FIG. 1.
Figure 4:
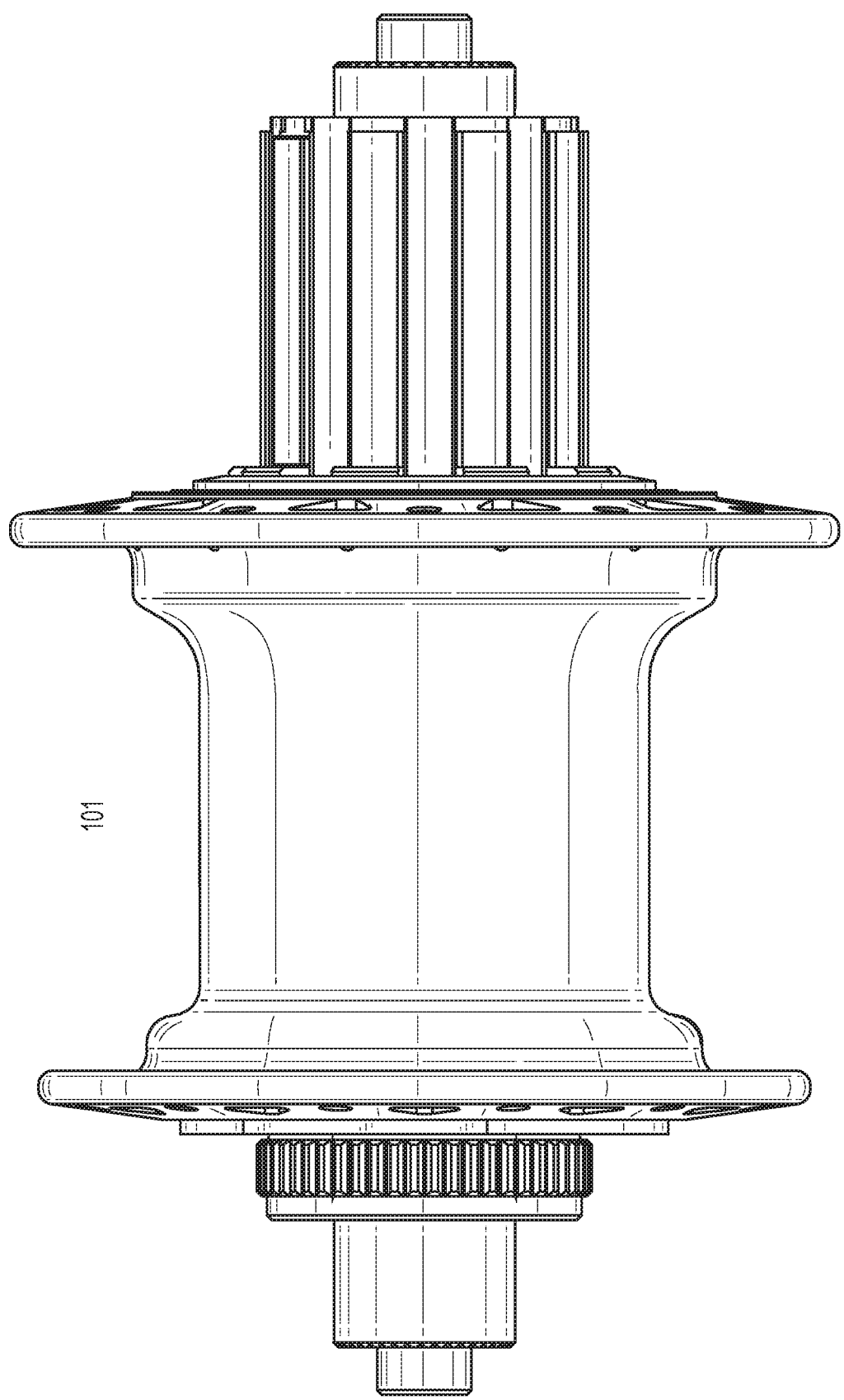
FIG. 4 shows a right plan view of the interchangeable hub system for bicycle wheel of FIG. 1.
Figure 5:
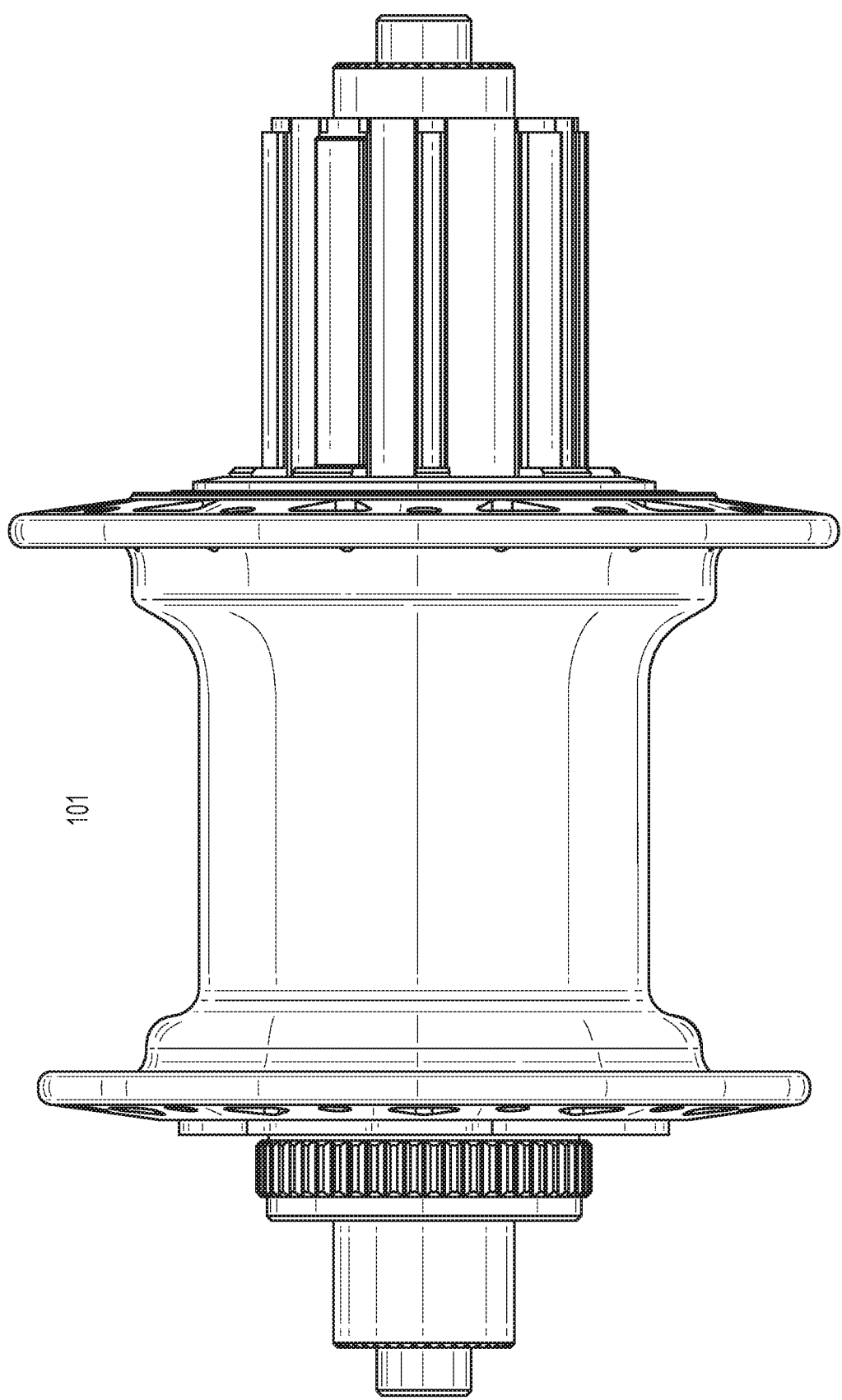
FIG. 5 shows top plan view of the interchangeable hub system for bicycle wheel of FIG. 1.
Figure 6:
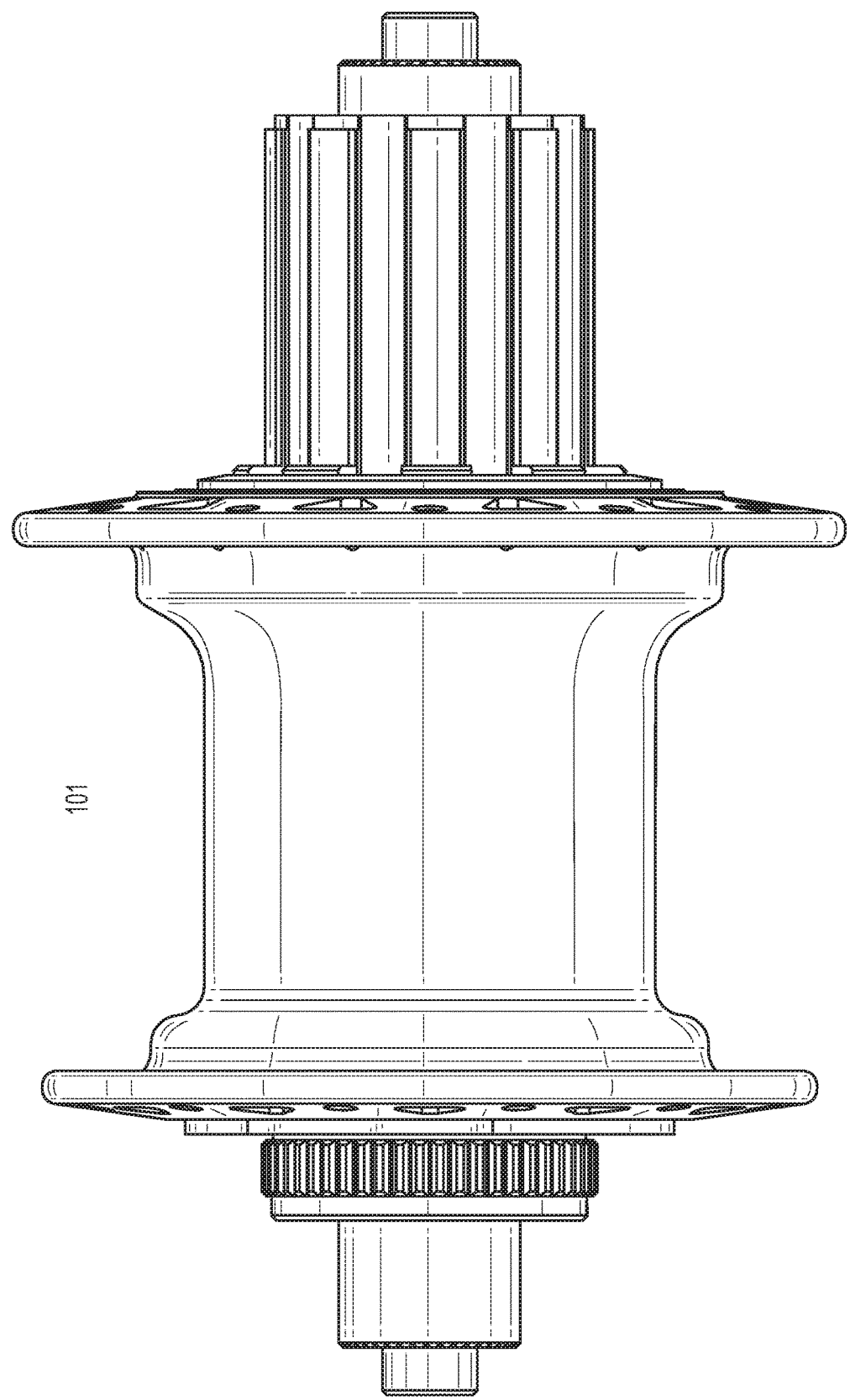
FIG. 6 shows a bottom plan view of the interchangeable hub system for bicycle wheel of FIG. 1.
Figure 7:
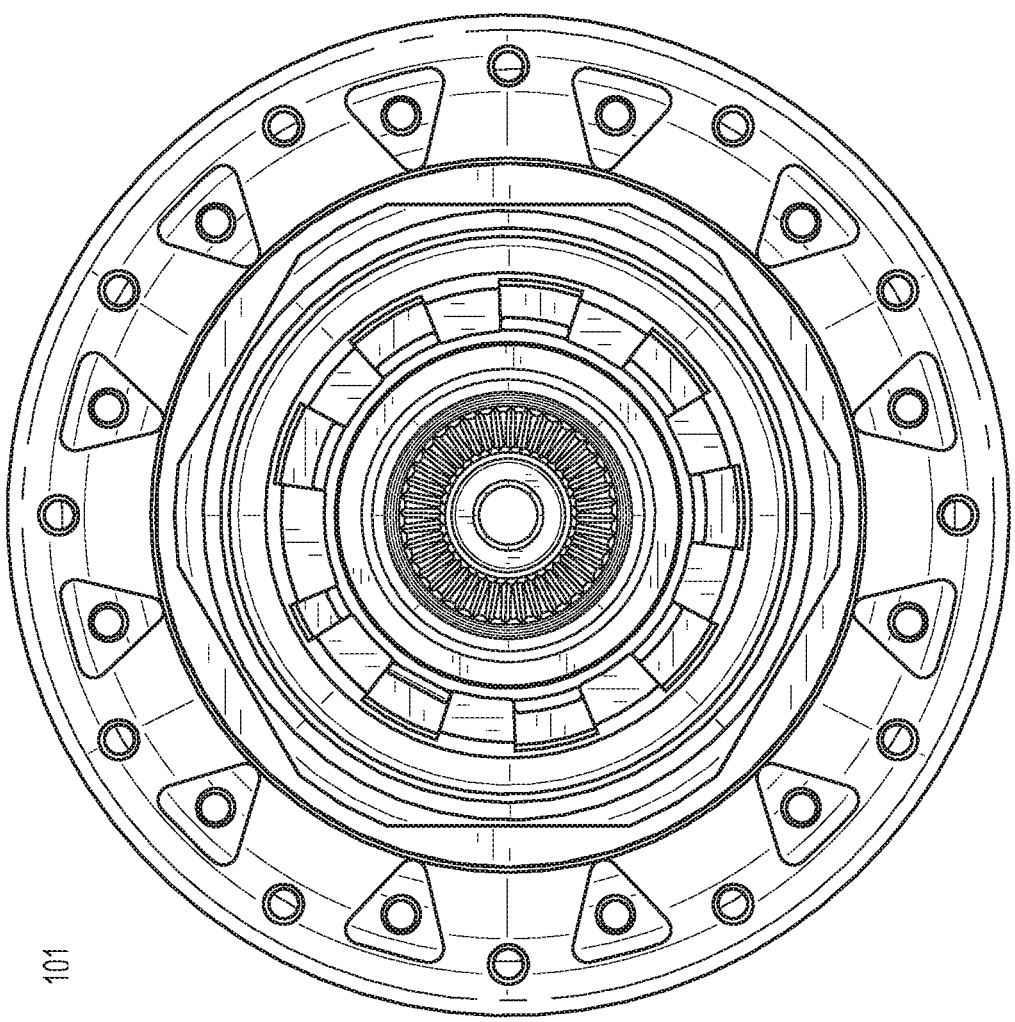
FIG. 7 shows a rear plan view of the interchangeable hub system for bicycle wheel of FIG. 1.
Figure 8:
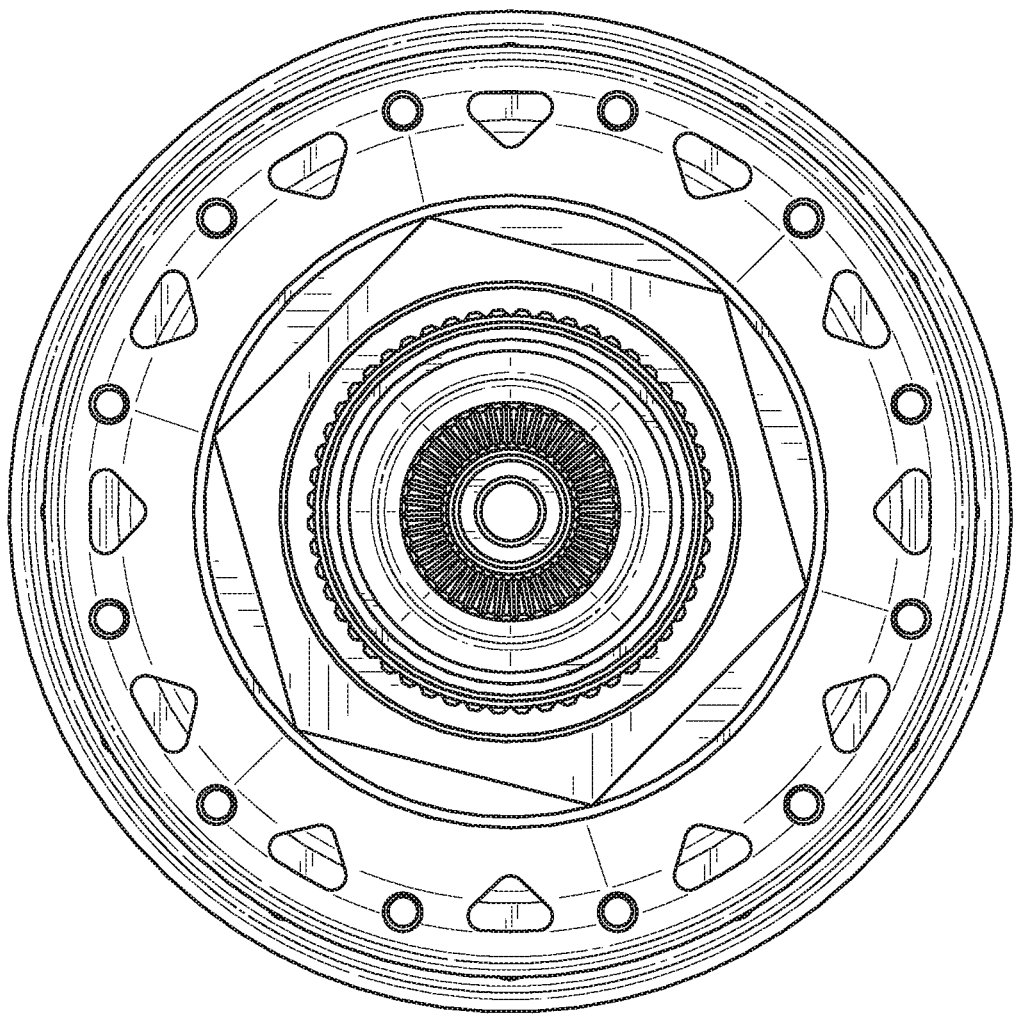
FIG. 8 shows a front plan view of the interchangeable hub system for bicycle wheel of FIG. 1.
Figure 9:
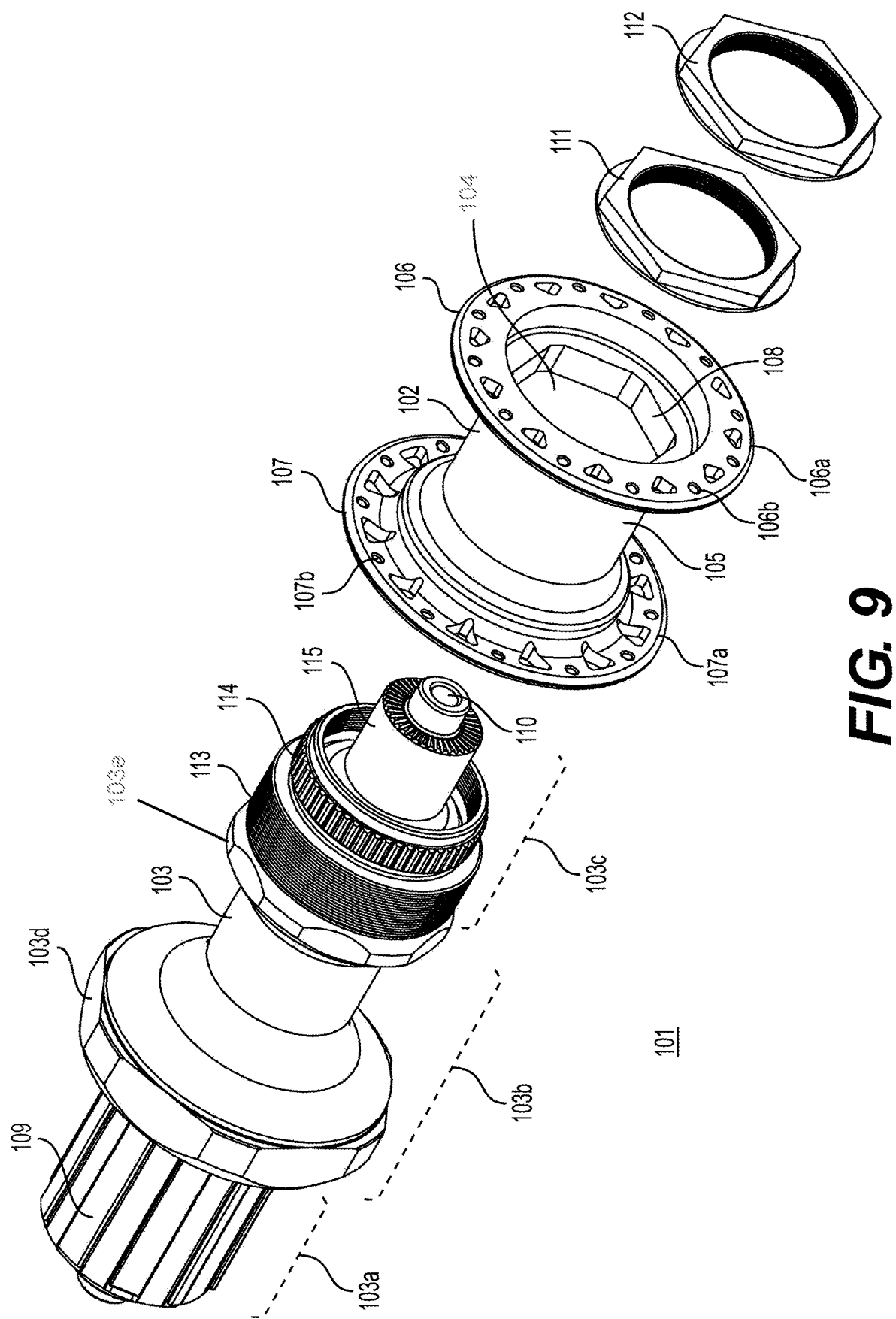
FIG. 9 shows an exploded perspective view of the interchangeable hub system for bicycle wheel of FIG. 1.
Figure 10:
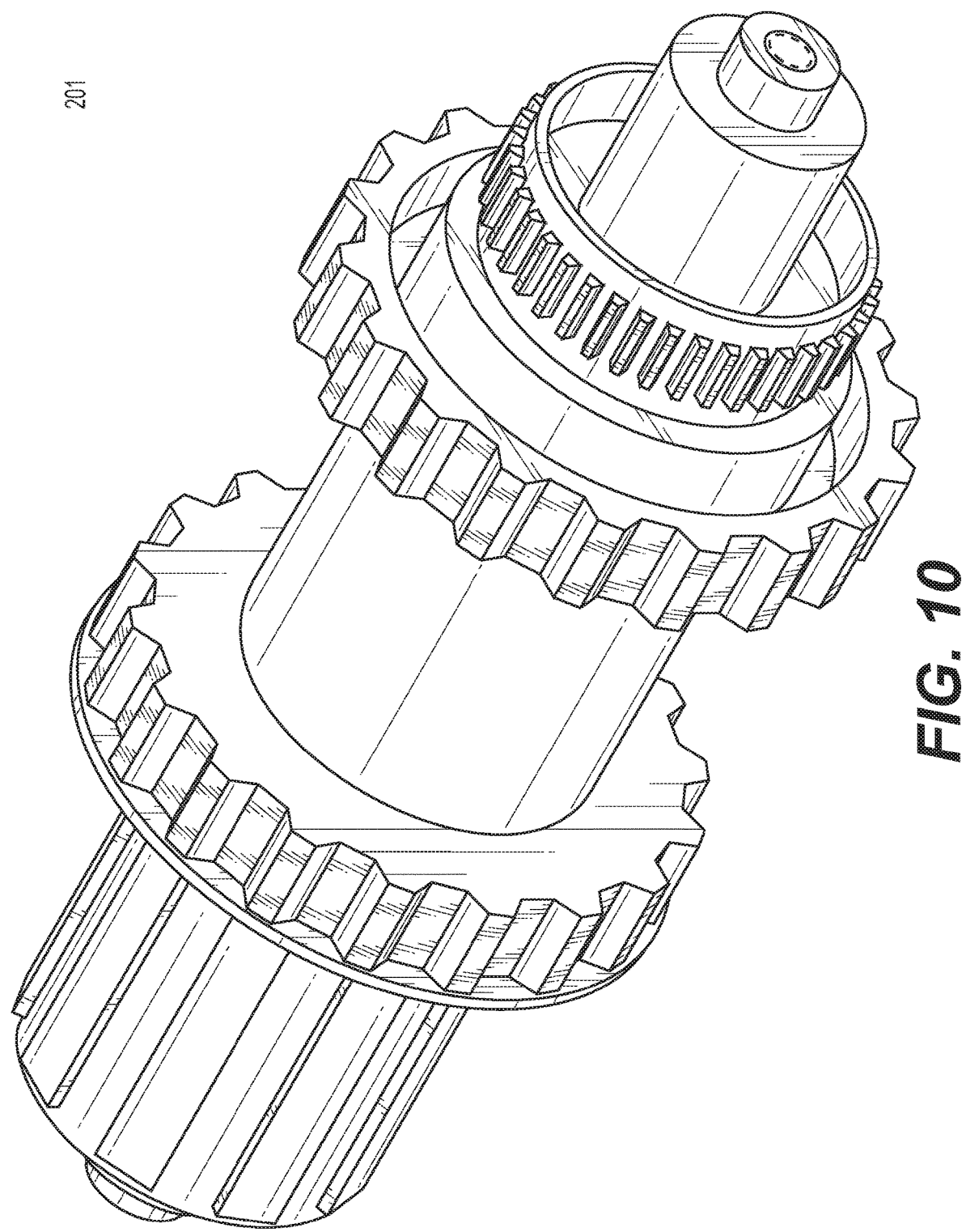
FIG. 10 shows a front perspective view of a second embodiment of a hub system for bicycle wheel.
Figure 11:
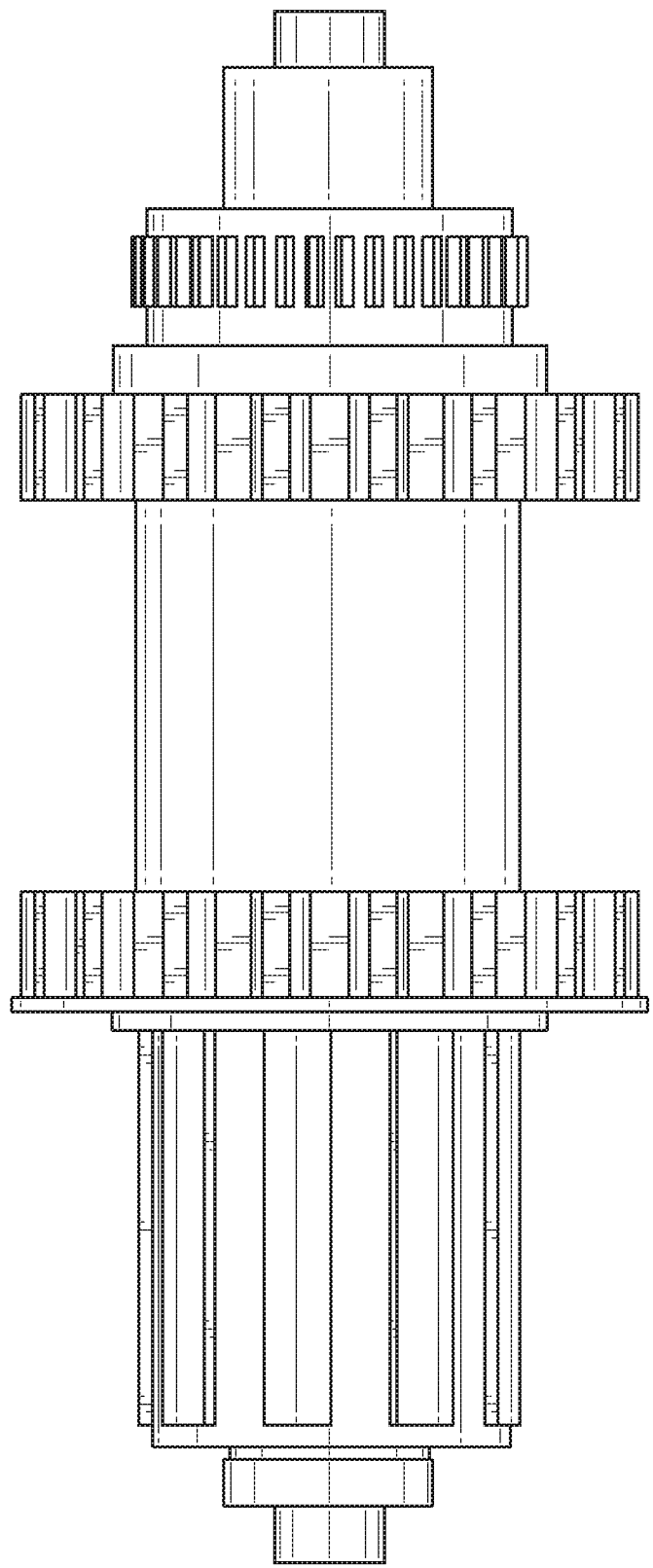
FIG. 11 shows a front plan view of the interchangeable hub system for bicycle wheel of FIG. 10.
Figure 12:
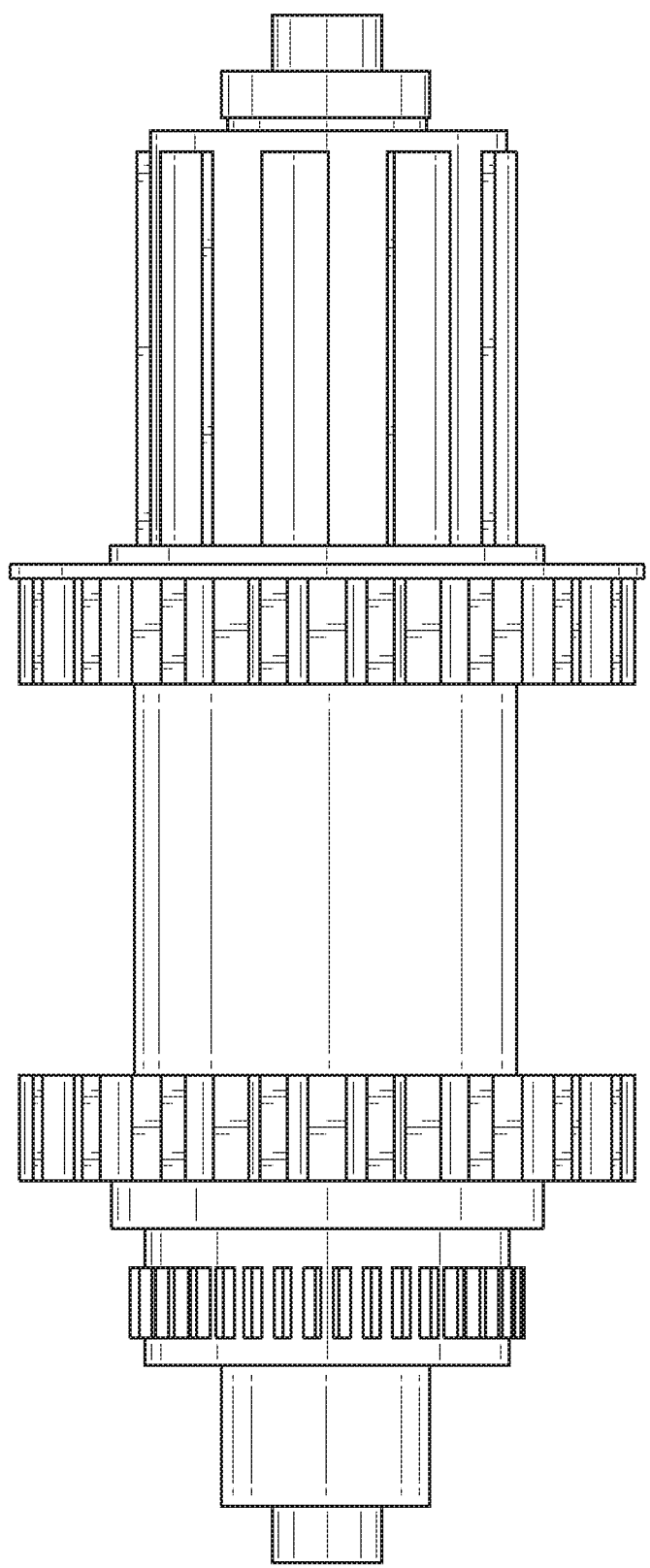
FIG. 12 shows a rear plan view of the interchangeable hub system for bicycle wheel of FIG. 10.
Figure 13:
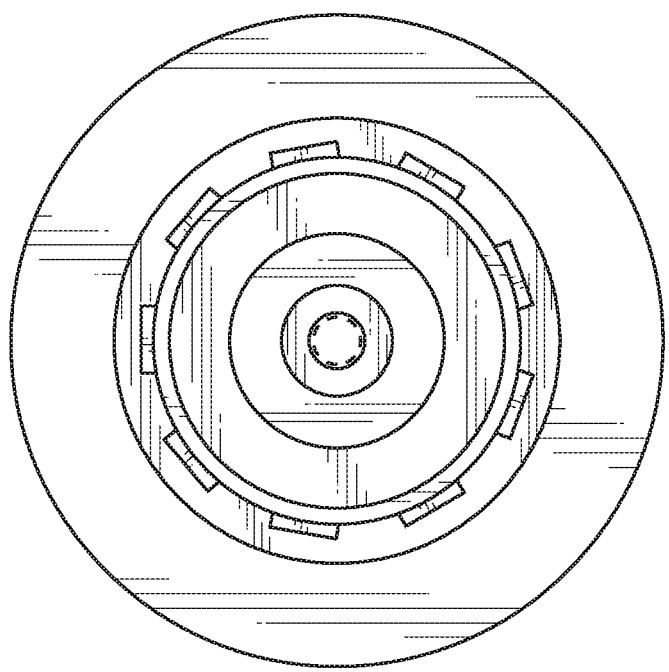
FIG. 13 shows a left plan view of the interchangeable hub system for bicycle wheel of FIG. 10.
Figure 14:
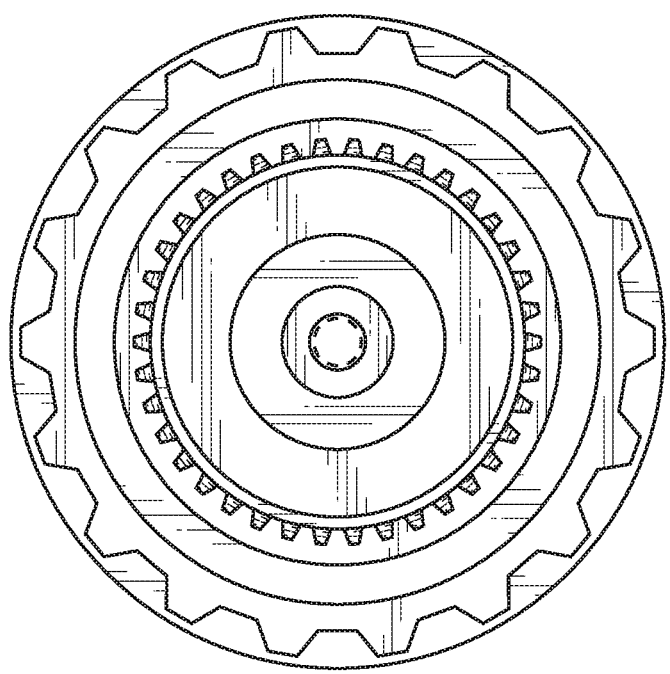
FIG. 14 shows right plan view of the interchangeable hub system for bicycle wheel of FIG. 10.
Figure 15:
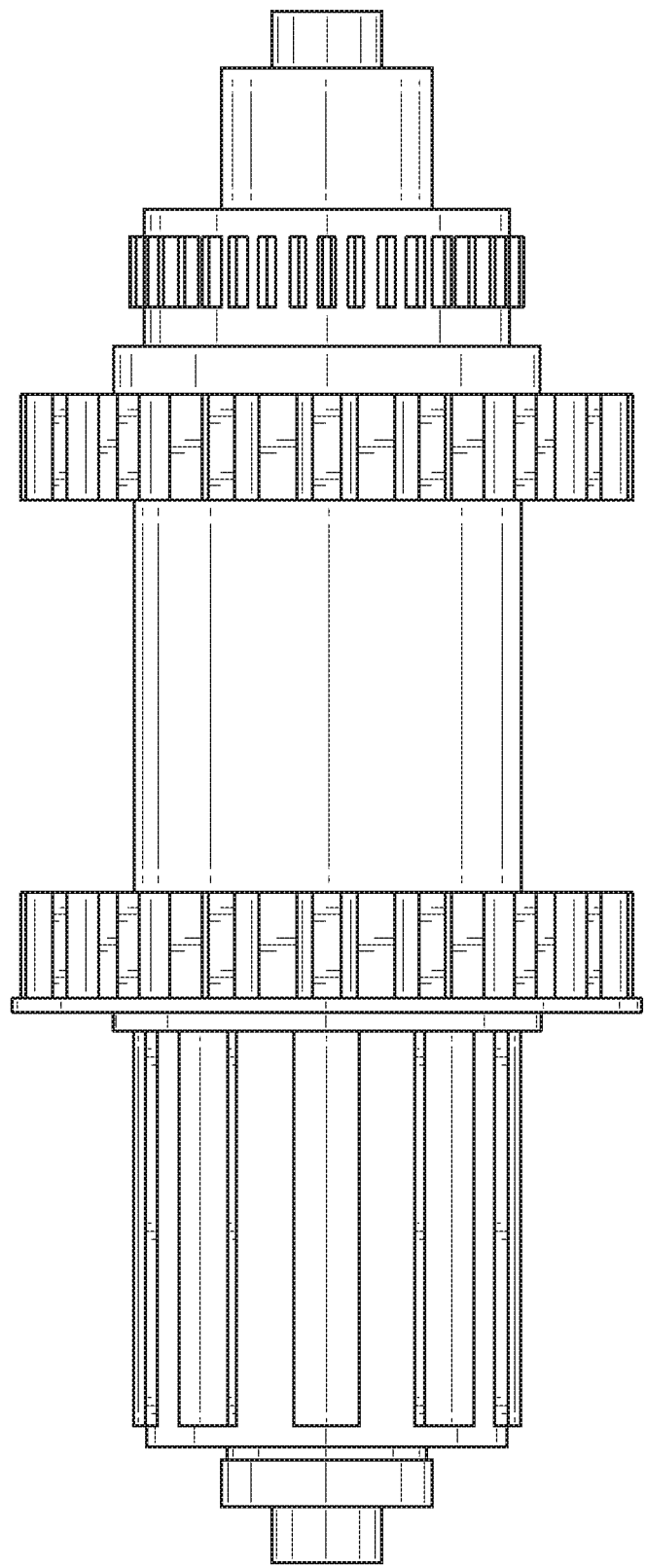
FIG. 15 shows a top plan view of the interchangeable hub system for bicycle wheel of FIG. 10.
Figure 16:
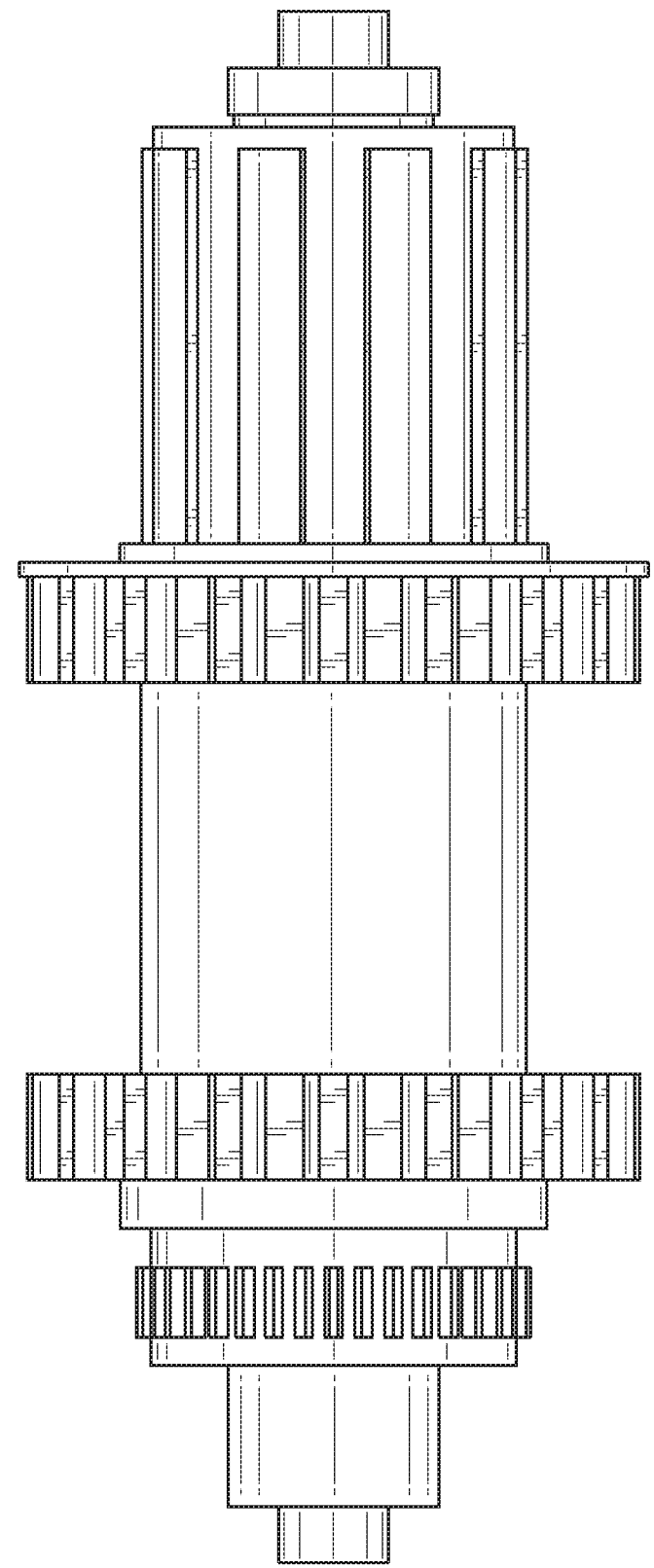
FIG. 16 shows a bottom plan view of the interchangeable hub system for bicycle wheel of FIG. 10.

FIGS. 1-8 show various view of an exemplary interchangeable hub system 101 in accordance with the present invention. Turning to the exploded view shown in FIG. 9, hub system 101 comprises hub shell 102 and an internal component 103. First, hub shell 102 will be described. Hub shell 102 has a hollow main cylindrical body 105 having an opening 104 therethrough. Cylindrical main body 105 has two distal ends, right distal end 106 and left distal end 107. Formed at each of right and left distal ends 106 and 107 are radially extending circular hub flanges 106a and 107a, each having diameters. Circular hub flange 106a has a diameter smaller than a diameter of circular flange 107b. Formed along each of circular flanges 106a and 107a are equally-spaced holes 106b and 107b, respectively, to allow for bicycle wheel spokes to be attached thereto. Formed along an inside of hub shell at each end of opening 104 are hexagonal edges 108 to mate with hexagonal surfaces formed on internal component 103, described next.

Internal component 103 generally has three sections, left 103a, center 103b, and right 103c sections. Left section 103a is formed at a first distal end of internal component 103 and right section 103c is formed at a second distal end of internal component 103. Formed on left section 103a at first distal end is a slotted cassette holder body 109, which can accept various bicycle cassettes. On the right section 103c is disc brake interface 114 and an end cap 115. Extending between first and second distal ends of internal component 103 is skewer hole 110 to allow a skewer (not shown) to pass therethrough and attach the hub system (and attached wheel) to the frame of the bicycle. Center section 103b is defined by hexagonal edges 103d and 103e at each end thereof, which mate with hexagonal edges (e.g., 108) of hub shell 102 described above.

Internal component 103 mates with hub shell 102 by sliding into opening 104 of hub shell 102. Internal component 103 can be secured within hub shell 102 by first lock ring 111 and second lock ring 112 which threadedly mate with threaded portion 113 formed on a circumference of internal component 103.

In FIGS. 10-17, various views of a second exemplary interchangeable hub system 201 is shown.

Figure 17:
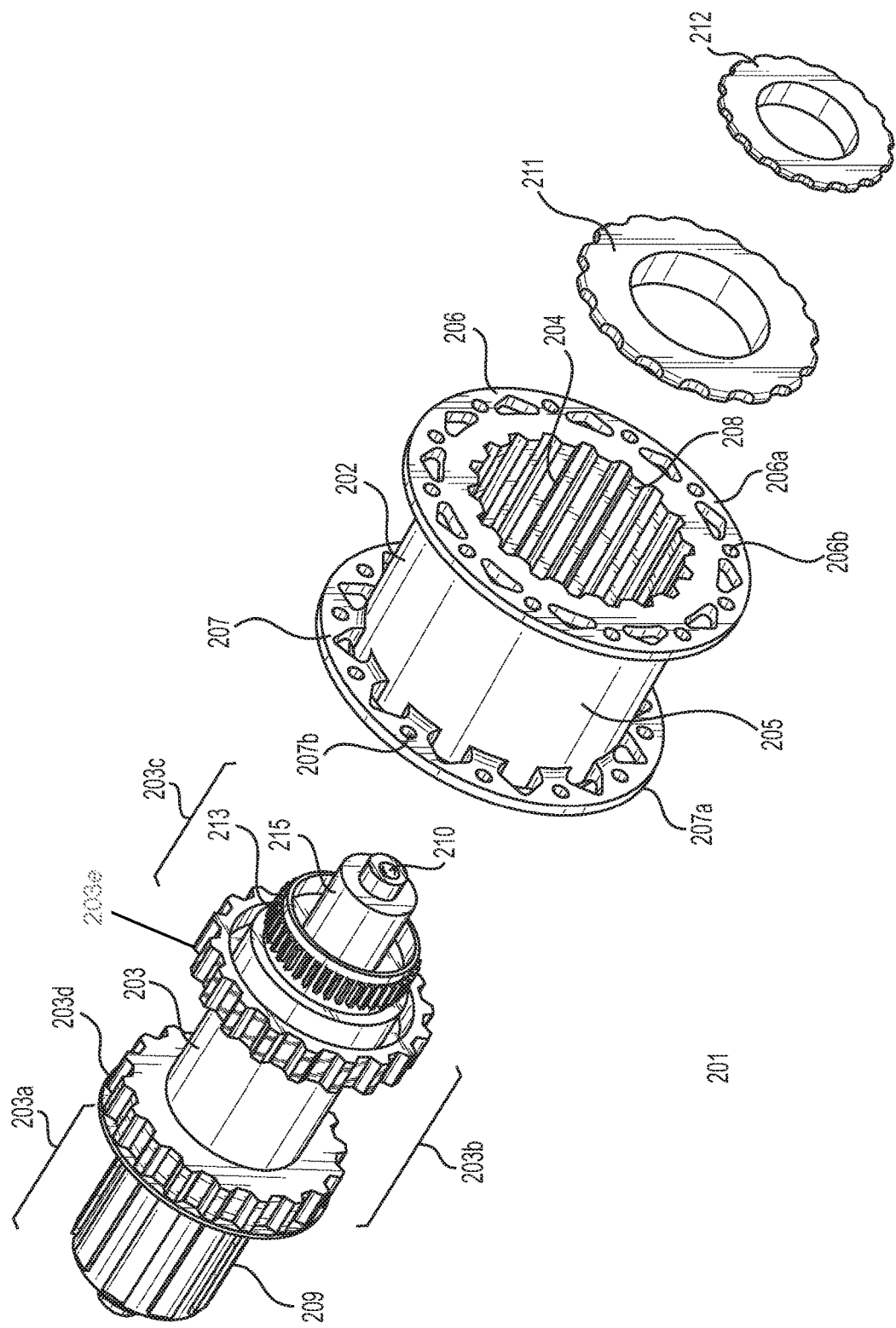
FIG. 17 shows an exploded perspective view of the interchangeable hub system for bicycle wheel of FIG. 10.

Turning to the exploded view shown in FIG. 17, hub system 201 comprises hub shell 202 and an internal component 203. First, hub shell 202 will be described. Hub shell 202 has a hollow main cylindrical body 205 having an opening 204 therethrough. Cylindrical main body 205 has two distal ends, right distal end 206 and left distal end 207. Formed at each of right and left distal ends 206 and 207 are radially extending circular hub flanges 206a and 207a, each having diameters. Circular hub flange 206a has a diameter smaller than a diameter of circular flange 207b. Formed along each of circular flanges 206a and 207a are equally-spaced holes 206b and 207b, respectively, to allow for wheel spokes to be attached thereto. Formed along an inside of hub shell at opening 204 are grooves 208 to mate with cogs 203d and 203e formed on internal component 203, described next.

Internal component 203 generally has three sections, left 203a, center 203b, and right 203c sections. Left section 203a is formed at a first distal end of internal component 203 and right section 203c is formed at a second distal end of internal component 203, and center section 203b is formed therebetween. On the right section 203c is disc brake interface 213 and an end cap 215. Formed on left section 203a at first distal end is a slotted cassette holder body 209, which can accept various bicycle cassettes. Extending between first and second distal ends of internal component 203 is skewer hole 210 to allow a skewer (not shown) to pass therethrough and attach the hub system (and attached wheel) to the frame of the bicycle. Center section 203b is defined by two sets of cogs 203d and 203e at each end thereof, which mate with grooves 208 of hub shell 202 described above.

Internal component 203 mates with hub shell 202 by sliding into opening 204 of hub shell 202. Internal component 203 is held within hub shell 202 by first lock ring 211 and second lock ring 212.

Hub shells can be made of alloy or titanium, for example. Hub flanges can have between 10 and 16 holes (for 20, 24, 28, and 32 spokes) on each side to accommodate bicycle spokes. The hexagonal shapes of different widths formed on the inside of the surface of hub shell force internal component to be slid into hub shell in a particular orientation. It would be understood that the number of sides or shape could be others than six or hexagonal.

Internal component can be made of alloy or titanium, for example. Lock rings can also be made of alloy or titanium. Lock rings thread either clockwise or counterclockwise to lock internal component in place. Lock rings and can both thread in the same clockwise or counter-clockwise direction or in opposite directions.

Figure 18:
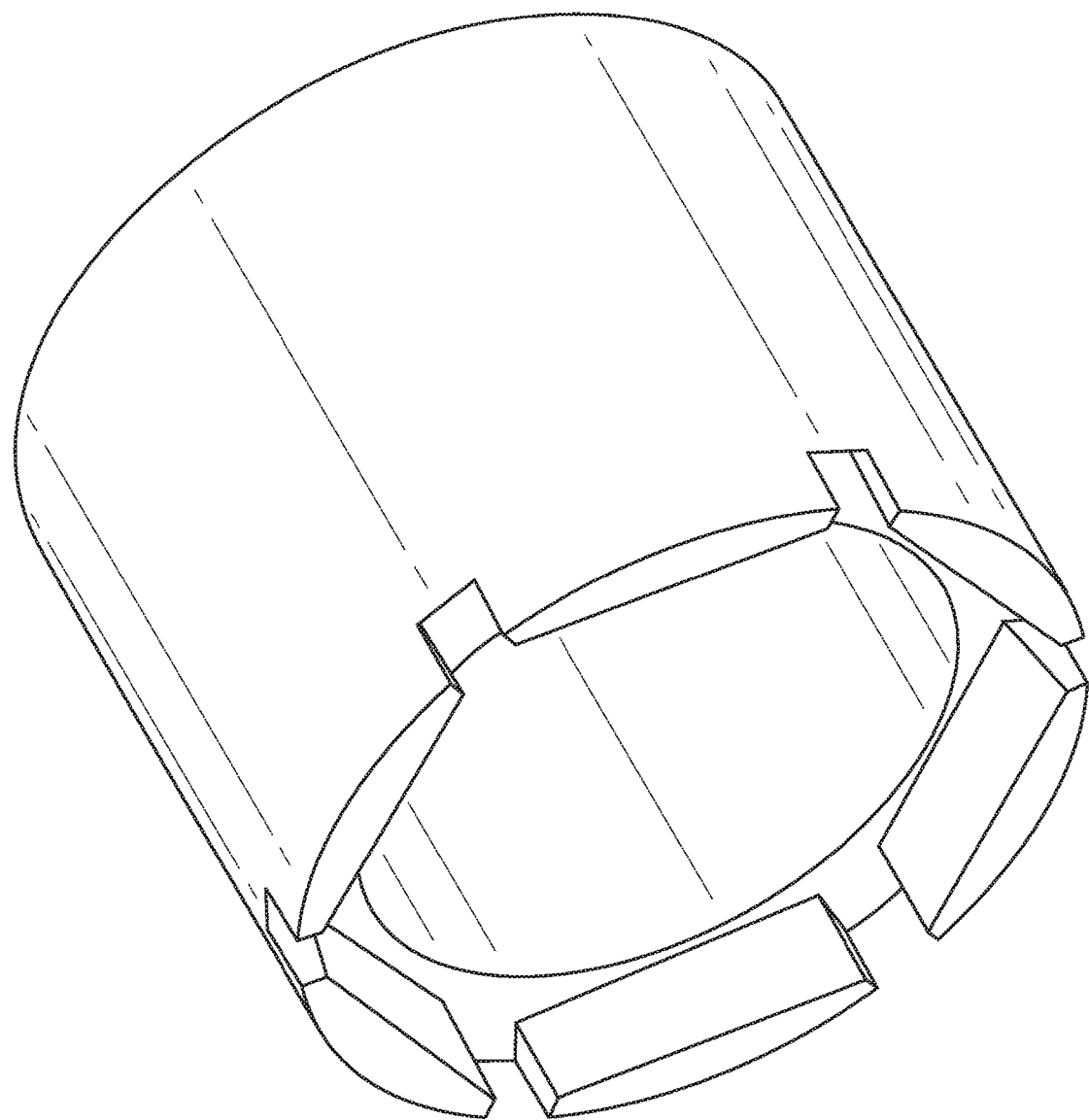
FIG. 18 shows an exemplary lock ring tool that can be used to remove the lock rings and separate the components.

To disassemble the interchangeable hub system (shown in FIGS. 1 and 2), a user would remove both lock rings and slide internal component out of the hub shell. The lock rings can be removed using an exemplary lock ring tool shown in FIG. 18. The user can now have the option install the internal component (with loaded cassette) into a different hub shell (not shown) from another model number wheel. Once the internal component is installed into a second hub shell, the lock rings can be screwed into place onto the threaded end of the internal component. Once secured, the second lock ring can then be locked into place using the threaded end of the internal component further securing the first lock ring into place.

The hub system in accordance with the present invention could be cut by either a forging process or by using a CNC machine and CNC lathe to cut both aluminum alloy and titanium (titanium alloy) blocks to form the hub shell and the internal components. The lock rings can be cut using a laser cutter or water jet cutter. After undergoing a strengthening process, the parts can be laser etched with engraving (as needed) and powder coated.

The hub system in accordance with the present invention requires minimal assembly and requires few parts. As weight of components is often a consideration for cycling, the hub system in accordance with the present invention has a minimum number of components allowing for the lightest possible weight. Lighter materials, such as carbon fiber, could be used to reduce overall weight. However, reliability and safety could be compromised when using other less durable materials. One alternate reconfiguration, for example, would be to vary the hub shell flange size to vary lateral stiffness. Further, depending on what type of cycling or wheel is used, the number of holes on the hub flange would need to be varied to accommodate different types of wheels and athletes.

While the foregoing written description of the invention enables one of ordinary skill in the art to make and use the invention, those of ordinary skill in the art will understand and appreciate the existence of variations, combination, and equivalents of the embodiments, methods, and examples provided herein. The invention should, therefore, not be limited by the embodiments and examples disclosed here, but by all embodiments and methods within the scope and spirit of the invention as claimed.

The invention claimed is:

1. An interchangeable hub system comprising:
a hollow cylindrical hub shell having right and left distal ends, said hollow cylindrical hub shell having an opening therethrough and radially extending flanges at said right and left distal ends thereof, said radially extending flanges having regularly-spaced holes sized to receive bicycle wheel spokes, said cylindrical hub comprising a plurality of edges forming a shape of a hexagon provided at each end of said opening of said cylindrical hub creating first and second hexagons, wherein the diameter of the first hexagon is greater than the diameter of the second hexagon to force an orientation, said opening comprising a first end having the first hexagon adjacent to the left distal end and a second end having the second hexagon adjacent to the right distal end and recessed from the flange at said right distal end toward the left distal end;
an internal component capable of sliding into said opening of said hollow cylindrical hub shell, said internal component having first and second distal ends with a skewer hole extending therethrough, wherein said first distal end comprises a slotted cassette holder body and said second distal end comprises a threaded portion, said internal component has a first discrete section at the first distal end and a second discrete section adjacent to the second distal end, both in the shape of hexagons to mate with the plurality of edges of said opening, the threaded portion extending from second discrete section toward the second distal end; and
a first lock ring capable of mating with said threaded portion of said internal component to secure said internal component within said cylindrical hub shell, wherein said first lock ring is housed within a recess at the right distal end when mating with said threaded portion.

2. The interchangeable hub system according to claim 1, wherein the system comprises a second lock ring capable of mating with said threaded portion of said internal component to secure said internal component within said cylindrical hub shell.

3. The interchangeable hub system according to claim 2, wherein each of said lock rings has a plurality of planar surfaces to allow for a lock ring tool to mate with and remove said lock rings.

4. The interchangeable hub system according to claim 2, wherein said second lock ring is housed within the recess when mating with said threaded portion.

* * * * *